US012562531B2

(12) United States Patent
Weber et al.

(10) Patent No.: US 12,562,531 B2
(45) Date of Patent: Feb. 24, 2026

(54) EMI SHIELD FOR SIMPLIFIED CONNECTOR MANUFACTURING

(71) Applicant: Apple Inc., Cupertino, CA (US)

(72) Inventors: Robert V. Weber, Redwood City, CA (US); Min Chul Kim, Santa Clara, CA (US); Joshua J. Pong, San Jose, CA (US)

(73) Assignee: Apple Inc., Cupertino, CA (US)

( * ) Notice: Subject to any disclaimer, the term of this patent is extended or adjusted under 35 U.S.C. 154(b) by 304 days.

(21) Appl. No.: 17/855,516

(22) Filed: Jun. 30, 2022

(65) Prior Publication Data

US 2024/0006821 A1 Jan. 4, 2024

(51) Int. Cl.

*H01R 13/6582* (2011.01)
*H01R 13/6597* (2011.01)
*H01R 24/60* (2011.01)

(52) U.S. Cl.

CPC ..... *H01R 13/6582* (2013.01); *H01R 13/6597* (2013.01); *H01R 24/60* (2013.01)

(58) Field of Classification Search

CPC ................................ H01R 24/60; H01R 9/032
USPC .................. 439/626, 607.41, 607.47, 607.48
See application file for complete search history.

(56) References Cited

U.S. PATENT DOCUMENTS 4,653,836 A * 3/1987 Peele ................. H01R 13/6593 439/465
5,273,459 A * 12/1993 Davis ................. H01R 13/6593 439/607.48
5,380,223 A * 1/1995 Marsh ................ H01R 13/6582 439/357
5,409,400 A * 4/1995 Davis ..................... H01R 24/60 439/906
6,059,607 A * 5/2000 Wilson ................. H01R 13/648 439/607.47
6,565,388 B1 * 5/2003 Van Woensel ....... H01R 13/514 439/357
7,909,647 B2 * 3/2011 Kawaguchi ...... H01R 13/65915 439/585
8,777,666 B2 7/2014 Golko
9,011,179 B2 4/2015 Siahaan
2003/0104728 A1 * 6/2003 Inagawa ............ H01R 13/6593 439/607.48
2014/0273585 A1 * 9/2014 Dang ................. H01R 13/6275 439/345

* cited by examiner

*Primary Examiner* — Gary F Paumen
(74) *Attorney, Agent, or Firm* — Kilpatrick Townsend & Stockton LLP

(57) ABSTRACT

Connector inserts and connector receptacles having a reduced number of individual parts and that can be manufactured with a reduced number of manufacturing steps and tools. An example provides connector inserts and connector receptacles having a reduced number of individual parts by including one or more parts that can be used more than once in each connector. In another example, connector inserts or connector receptacles can be formed with a reduced number of different manufacturing steps and tools.

12 Claims, 12 Drawing Sheets

EMI SHIELD FOR SIMPLIFIED CONNECTOR MANUFACTURING

BACKGROUND

The number of types of electronic devices that are commercially available has increased tremendously the past few years and the rate of introduction of new devices shows no signs of abating. Devices such as tablet computers, laptop computers, all-in-one computers, desktop computers, cell phones, storage devices, wearable-computing devices, portable media players, portable computing devices, navigation systems, monitors, adapters, and others, have become ubiquitous.

These electronic devices can share power and data over cables that can include one or more wires, fiber optic cables, or other conductors. Connector inserts can be located at each end of these cables and can be inserted into connector receptacles in communicating electronic devices to form pathways for power and data.

These connector inserts and connector receptacles typically are formed of several individual parts, such as shells, covers, housings, contacts, printed circuit boards, and the like. Each of these parts needs to be designed, manufactured, tracked, inventoried, inspected, and then put together to form a connector insert or connector receptacle. Each of these steps consumes resources. Accordingly, it can be desirable to provide connector inserts and connector receptacles having a reduced number of parts.

Each of these parts needs to be precisely manufactured to properly fit and work together. This manufacturing often includes several steps, such as stamping, molding, machining, and others, and each step can require one or more different tools. As a result, each of these manufacturing steps consumes further resources. Accordingly, it can be desirable to provide connector inserts and connector receptacles that can be manufactured with a reduced number of manufacturing steps and tools.

Thus, what is needed are connector inserts and connector receptacles having a reduced number of individual parts and that can be manufactured with a reduced number of manufacturing steps and tools.

SUMMARY

Accordingly, embodiments of the present invention can provide connector inserts and connector receptacles having a reduced number of individual parts and that can be manufactured with a reduced number of manufacturing steps and tools. An illustrative embodiment of the present invention can provide connector inserts and connector receptacles having a reduced number of individual parts by including one or more parts that can be used more than once in each connector. Using multiple identical parts in a connector insert or connector receptacle can reduce the total number of parts that need to be designed, manufactured, tracked, inventoried, and inspected. Using multiple identical parts can also reduce a total number of manufacturing steps and tools needed as compared to using multiple different parts. Also, the identical parts can be designed in such a way that connector inserts and connector receptacles can be manufactured using a reduced number of steps and tools.

In these and other embodiments of the present invention, various structures of a connector insert or connector receptacle can be formed of identically manufactured parts. For example, an electro-magnetic interference (EMI) shield can be formed of multiple, identical parts. An EMI shield for a connector insert or connector receptacle can be formed of two, three, or more than three identical parts. An EMI shield can be formed of two identical parts, where two parts can be rotationally symmetrical and arranged to fit together to form the EMI shield. This can reduce the number of parts that need to be designed, manufactured, tracked, inventoried, and inspected. Using two identical parts can also reduce the number of manufacturing steps and tools needed to form an EMI shield. For example, where two or more different parts are used, a corresponding increase in a number of different manufacturing steps and tools can be needed. Where two or more identical parts are used, there is no increase in the number of additional different manufacturing steps or tools needed to form the second and subsequent identical parts.

In these and other embodiments of the present invention, various parts of a connector insert or connector receptacle can be formed such that the number of different manufacturing steps that is needed to form the connector insert or connector receptacle can be reduced. For example, parts used to form an EMI shield can be configured such that a number of manufacturing steps that is needed to form the connector insert or connector receptacle is reduced.

As an example, in these and other embodiments of the present invention, an EMI shield portion can include an integrated crimping feature. By integrating the crimping feature, the number of parts needed to form a connector insert or connector receptacle can be reduced. Each EMI shield portion can include a body and the crimping feature, where the crimping feature is a crimp arm that is attached to the body by an extension. The crimp arm can include a curved section and a straight section, where some or all of the curved section can be between the straight section and the extension. The extension can attach to various locations on the body of the EMI shield portion. The extension can typically attach to a rear of the body. For example, the extension can attach to or near a rear of the body at or near the top of the body, at or near a bottom of the body, or at or near a center or midpoint of the body. The extension can typically attach to the curved section of the crimp arm of the EMI shield portion. The extension can attach to the crimp arm at or near an end of the curved section, at or near a center of the curved section, between the center and the end of the curved section, between the center of the curved section and a start of the straight section, at a start of the straight section, or other location on the curved section or elsewhere on the crimp arm.

The crimping feature can be configured such that when two EMI shield portions are joined to form an EMI shield, a cable can pass through an opening formed by the two curved sections of the crimp arms. A braiding or other shield of the cable can be exposed on the contact to physically and electrically contact the crimp arms of the EMI shield. The straight sections can be compressed around the cable to encircle the cable during manufacturing. For example, a single crimping tool can be used to wrap the straight sections around the cable. Also, the crimp can be sufficiently effective that no solder is needed to ensure an electrical connection between the crimp arms and cable braiding. Manufacturing of a connector insert or connector receptacle can be simplified and one or more steps can be omitted since a reduced number of steps can be needed for crimping and soldering is not needed for a reliable connection.

After crimping, the straight sections can overlap. For example, the crimp arms can each encircle 270 degrees around the cable, though the crimp arms can each encircle more than 180 degrees to less than 360 degrees around the cable. In these and other embodiments of the present invention, the crimp arms can be arranged to not overlap, or to overlap a minimal amount. For example, the crimp arms can each encircle 180 degrees or less than 180 degrees around the cable. Configurations where the crimp arms do not overlap, or where the amount of overlap is limited, can be useful by keeping the crimp around the cable to a minimal thickness, which can help in forming a strain relief, cover, and other parts of a connector insert or connector receptacle.

These and other embodiments of the present invention can provide EMI shield portions having interlocking features. These interlocking features can allow two or more EMI shield portions to mate or fit together to form an EMI shield. For example, each EMI shield portion can include one, two, three, or more than three first tabs that can fit under a surface of the body of a mating EMI shield portion. Each EMI shield portion can include one, two, three, or more than three second tabs that can fit in corresponding notches or cutouts in the body of the mating EMI shield portions. The first tab or tabs and the second tab or tabs can be on the same side of the body, or they can be on different sides. The mated EMI shield portions can be soldered, laser-welded, spot-welded, or otherwise fixed together to form the EMI shield.

These and other embodiments of the present invention can provide various types of structures for various connector inserts and connector receptacles. A connector insert can include a number of contacts that can physically and electrically connect to corresponding contacts in a corresponding connector receptacle when the connector insert and the connector receptacle are mated. The connector insert can include an end of a cable. The cable can include a number of conductors and a cable shield. A contact in the number of contacts can be coupled to one of the plurality of conductors. A housing can be used to support the number of contacts and provide an opening for corresponding mating features on a connector receptacle. For example, the housing can provide an opening that can accept a tongue of a connector receptacle when the connector insert and connector receptacle are mated. A shell can provide a ground path and can be located around the housing and contacts. An electro-magnetic interference (EMI) shield can be attached to the shell, for example by soldering, laser-welding, spot-welding, or other technique. The EMI shield can include a first EMI shield portion and a second EMI shield portion. The second EMI shield portion can be identical to the first EMI shield portion. A cover for manipulation by a user can be formed or molded around the EMI shield. These and similar structures can be used to form a connector receptacle as well. That is, while embodiments of the present invention are well-suited for use in connector inserts, these and other embodiments of the present invention can also be used and incorporated in connector receptacles.

The EMI shield can at least partially surround a circuit board, which can support circuits and components for the connector insert or connector receptacle. The EMI shield can protect circuitry and components within its confines from electro-magnetic interference generated by nearby or associated sources. The EMI shield can further protect nearby or associated circuits from electro-magnetic interference generated by circuitry and components within EMI shield 300.

In these and other embodiments of the present invention, EMI shields, contacts, shells, and other conductive portions of a connector insert or connector receptacle can be formed by stamping, progressive stamping, forging, metal-injection molding, deep drawing, machining, micro-machining, computer-numerically controlled (CNC) machining, screw-machining, 3-D printing, clinching, or other manufacturing process. The conductive portions can be formed of stainless steel, steel, copper, copper-titanium, phosphor-bronze, brass, nickel gold, copper-nickel, silicon alloys, or other material or combination of materials. They can be plated or coated with one or more layers of nickel, palladium, palladium-nickel, gold, or other material or combination of materials.

The nonconductive portions, such as housing, cover, strain reliefs, and other structures, can be formed using insert molding, injection molding, or other molding, 3-D printing, machining, or other manufacturing process. The nonconductive portions can be formed of silicon or silicone, polyimide, glass-filled nylon, polycarbonate, rubber, hard rubber, plastic, nylon, liquid-crystal polymers (LCPs), ceramics, thermoplastic elastomers (TPE) or other nonconductive material or combination of materials. The adhesives can be a pressure sensitive adhesive, heat activated film, polyimide film, or other adhesive. The boards can be flexible circuit boards or printed circuit boards and can be formed of FR-4 or other material.

Embodiments of the present invention can provide connector inserts and connector receptacles that are compliant with various standards such as Universal Serial Bus (USB), USB Type-C, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future.

Embodiments of the present invention can provide connector inserts and connector receptacles, where the connector receptacles can be located in various types of devices, such as portable computing devices, tablet computers, laptop computers, desktop computers, all-in-one computers, cell phones, storage devices, wearable-computing devices, portable computing devices, portable media players, navigation systems, monitors, adapters, and other devices, as well as corresponding connector inserts.

Various embodiments of the present invention can incorporate one or more of these and the other features described herein. A better understanding of the nature and advantages of the present invention can be gained by reference to the following detailed description and the accompanying drawings.

DESCRIPTION OF ILLUSTRATIVE EMBODIMENTS

Figure 1:
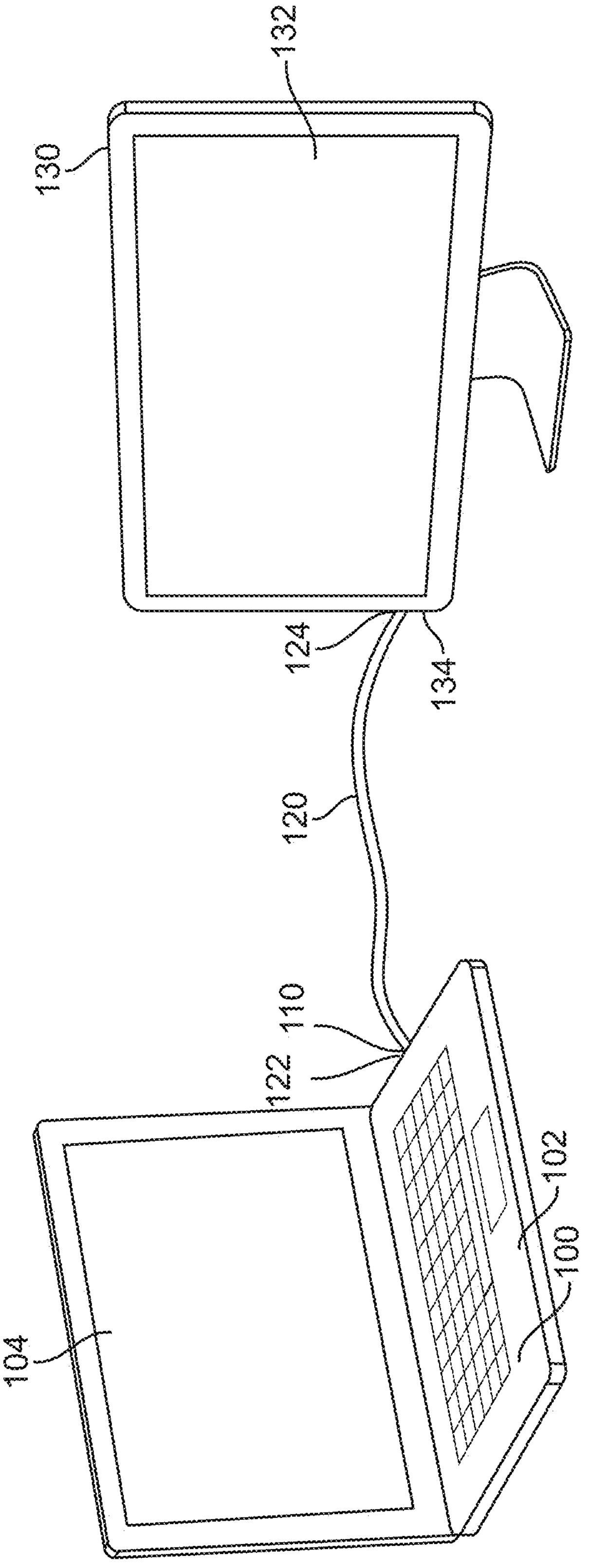
FIG. 1 illustrates an electronic system that can be improved by the incorporation of an embodiment of the present invention.

FIG. 1 illustrates an electronic system that can be improved by the incorporation of an embodiment of the present invention. This figure, as with the other included figures, is shown for illustrative purposes and does not limit either the possible embodiments of the present invention or the claims.

In this example, monitor 130 can be in communication with computer 100. Computer 100 can be substantially housed in device enclosure 102. Computer 100 can provide video or other data over cable 120 to monitor 130. Video data can be displayed on the video screen 132 of monitor 130. Computer 100 can similarly include a screen 104. In these and other embodiments the present invention, other types of devices can be included, and other types of data can be shared or transferred among the devices. For example, computer 100 and monitor 130 can be portable computing devices, tablet computers, desktop computers, laptops, all-in-one computers, wearable computing devices, smart phones, storage devices, portable media players, navigation systems, monitors, power supplies, video delivery systems, adapters, remote control devices, chargers, and other devices.

Cable 120 can include compatible connector insert 122 and compatible connector insert 124 that plug into connector receptacle 110 on computer 100 and connector receptacle 134 on monitor 130, respectively. Cable 120 can be one of a number of various types of cables. For example, cable 120, connector insert 122, and connector insert 124 can be compliant with various standards such as Universal Serial Bus (USB), USB Type-C, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future. An example of a connector insert 122 that can be used is shown in the following figure.

Figure 2:
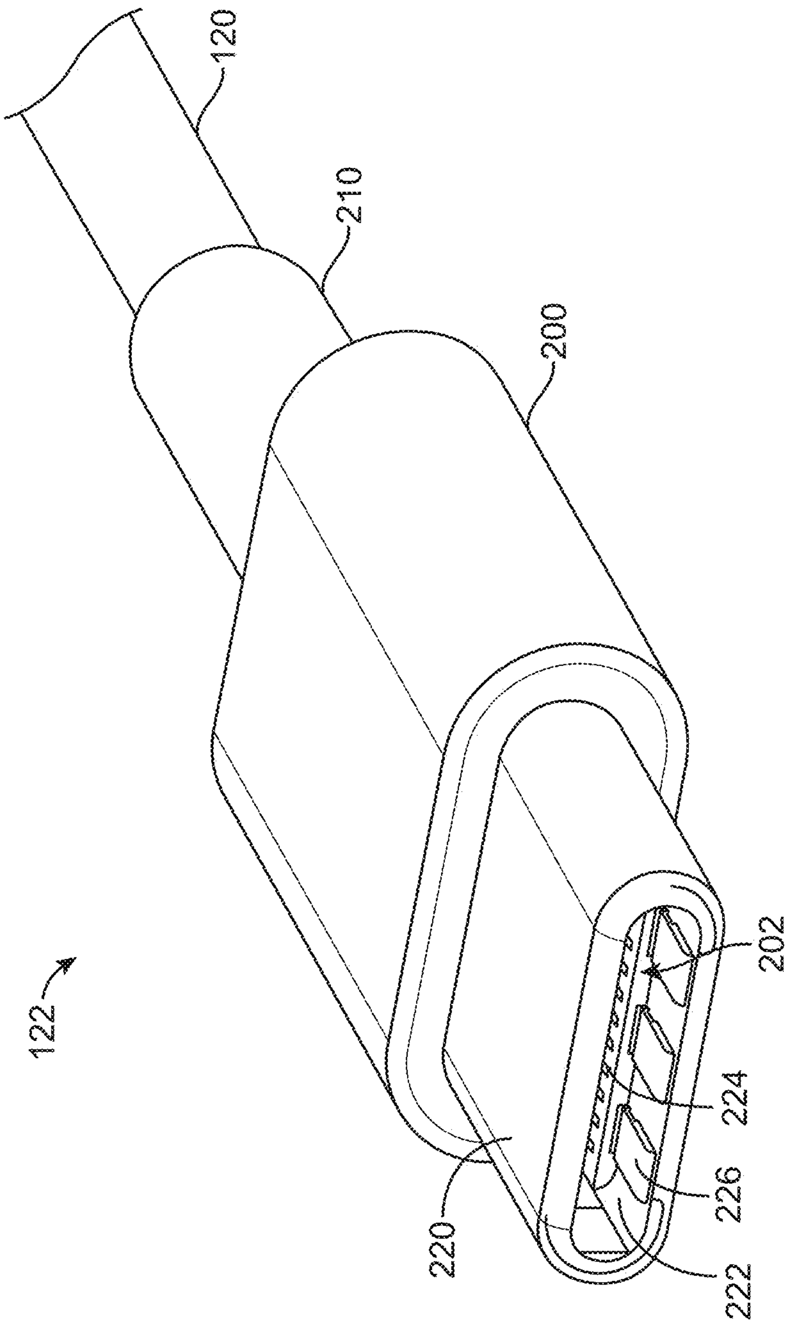
FIG. 2 illustrates a connector insert according to an embodiment of the present invention.

FIG. 2 illustrates a connector insert according to an embodiment of the present invention. Connector insert 122 can include contacts 224 supported by housing 222. Connector insert 122 can further include ground contacts 226 at a front of opening 202. Shell 220 can be located around ground contacts 226, contacts 224, and housing 222. Cover 200 can be formed around or attached to, for example using an adhesive, EMI shield 300 (shown in FIG. 3), which can be around a printed circuit board (not shown.) Various circuits or components (not shown) can be located on the printed circuit board.

Cable 120 can be attached to connector insert 122. One or more conductors (not shown) in cable 120 can be connected to contacts 224, ground contacts 226, shell 220, or one or more circuits inside cover 200. One or more ground conductors can connect to shell 220 or other shielding portions of connector insert 122. Strain relief 210 can protect an end of cable 120.

The printed circuit board and its circuits and components can be shielded by EMI shield 300. EMI shield 300 can be soldered, laser-welded, spot-welded, or otherwise physically and electrically attached to shell 220. EMI shield 300 can protect circuitry and components in connector insert 122 from electro-magnetic interference generated by nearby or associated sources. EMI shield 300 can further protect nearby or associated circuits from electro-magnetic interference generated by circuitry and components within EMI shield 300. While embodiments of the present invention are well-suited for use in connector inserts, such as connector insert 122 shown here, these and other embodiments of the present invention can also be used and incorporated in connector receptacles.

These and other embodiments of the present invention can provide connector inserts or connector receptacles that can be manufactured in very large numbers. Accordingly, it can be desirable to simplify the manufacturing of connector inserts and connector receptacles in order to conserve resources. Connector inserts and connector receptacles can be manufactured using many individual parts. Each of these different parts needs to be designed, manufactured, tracked, inventoried, and inspected before they can be used in manufacturing a connector insert or connector receptacle. Accordingly, embodiments of the present invention can reduce a number of different parts needed by using two, three, or more than three identical parts to form a structure of a connector insert or connector receptacle. By using identical parts in this way, a total number of different parts can be reduced. Also, it can be desirable to reduce a number of different manufacturing steps and tools need to complete a connector insert or connector receptacle. Using identical parts can mean that no additional different manufacturing steps or tools are needed for the second and subsequent identical parts. It can also be desirable that these parts are configured in such a way as to simplify their inclusion in a connector insert or connector receptacle, for example by simplifying one or more manufacturing steps and reducing a number of tools required to use the parts in the manufacturing of a connector insert or connector receptacle.

Various structures can be provided by embodiments of the present invention. For example, two, three, or more than three parts can be used to form one or more of the structures in connector insert 122 as shown above. In these and other embodiments of the present invention, EMI shield 300 can be formed of two or more identical EMI shield portions 310 (shown in FIG. 3.) Further details of EMI shield 300 are shown in the following figures.

Figure 3:
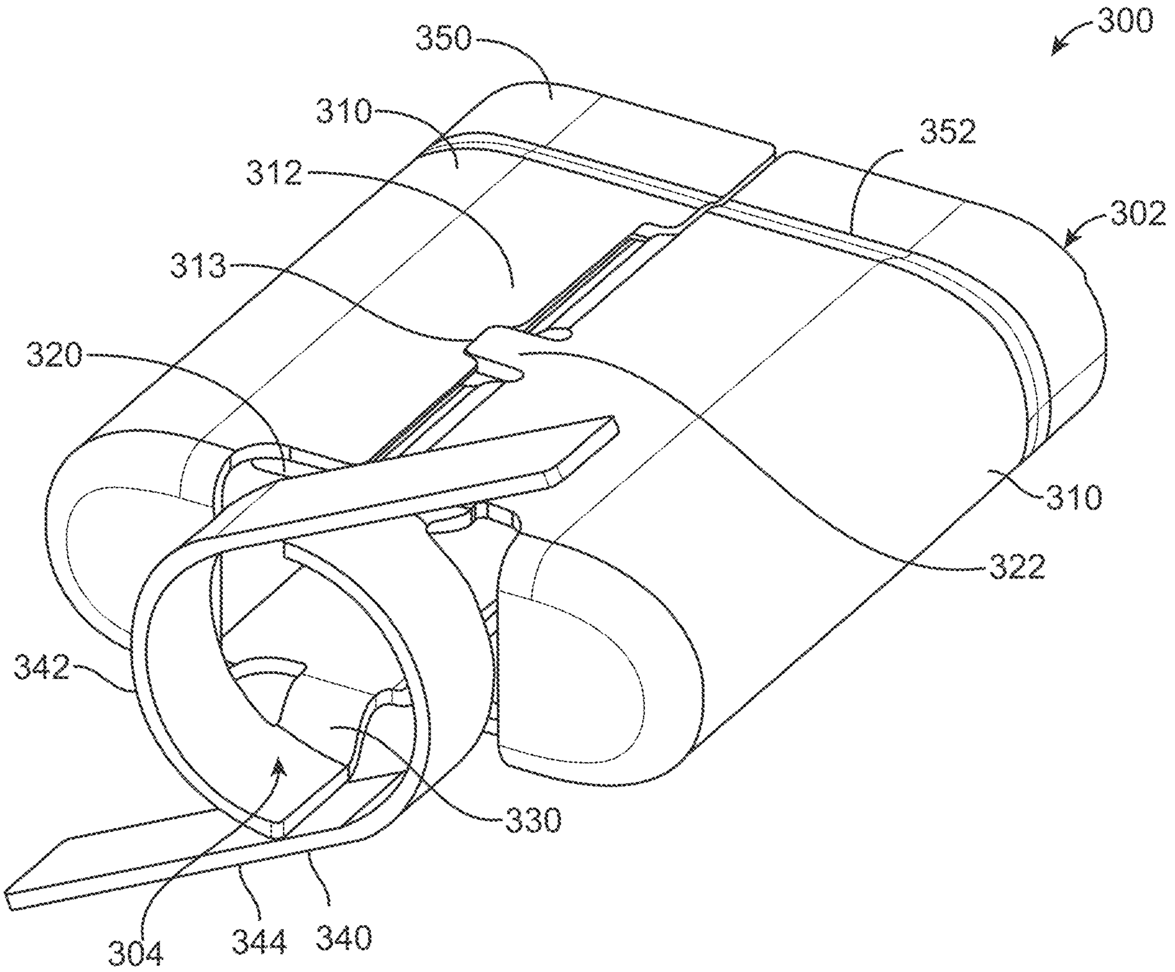
FIGS. 3-4 illustrate an EMI shield according to an embodiment of the present invention.
Figure 4:
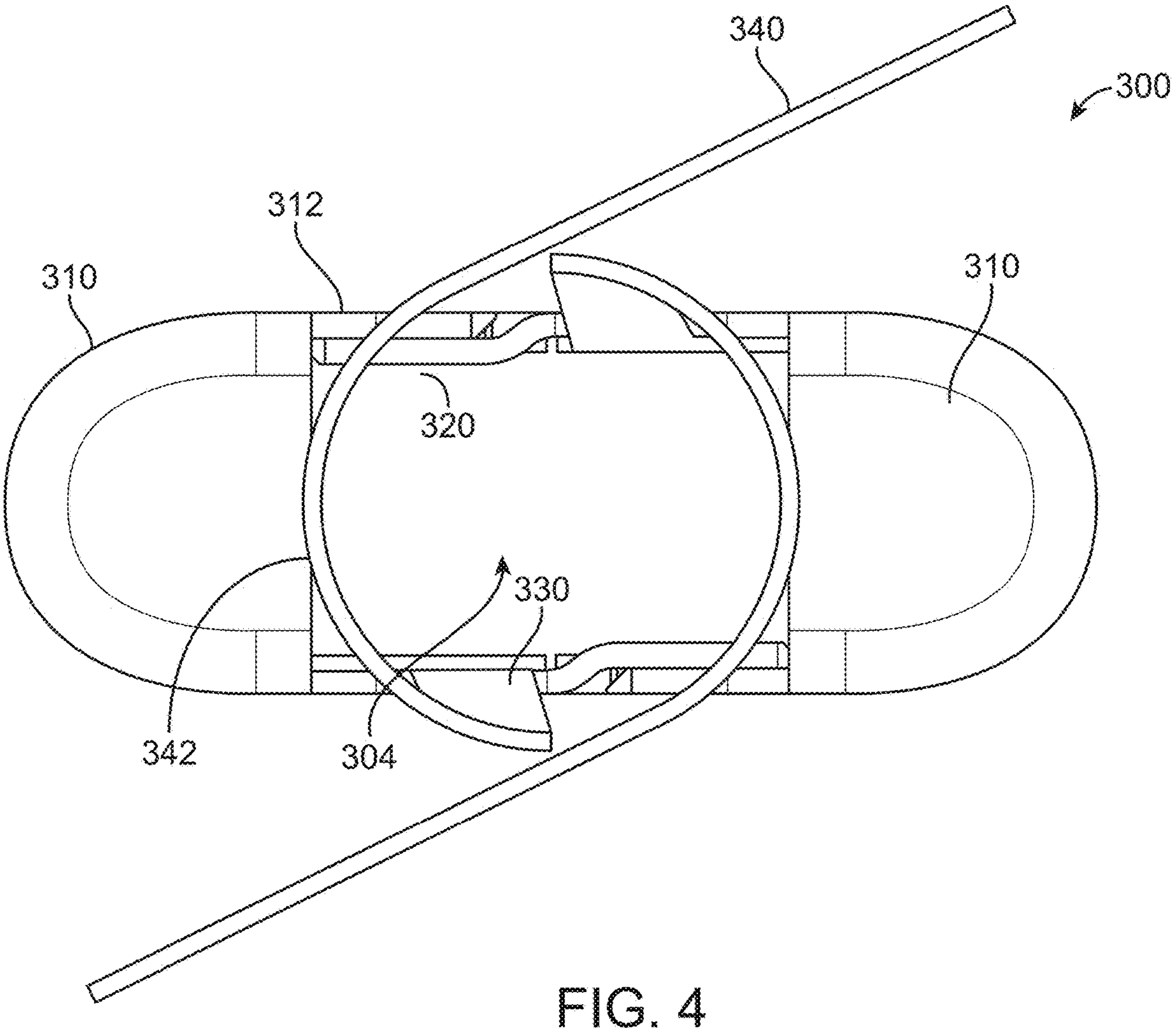

FIGS. 3 and 4 illustrate an EMI shield according to an embodiment of the present invention. In FIG. 3, EMI shield 300 can include two EMI shield portions 310 mated together. EMI shield can include front opening 302 for allowing passage of shell 220 and housing 222 (both shown in FIG. 2.) Tapered section 352 can lead to narrowed section 350 at front opening 302. Narrowed section 350 can be sized improve a fit with shell 220 and provide locations for soldering, laser-welding, or spot-welding shell 220 to EMI shield 300. Cable 120 (shown in FIG. 2) can pass through opening 304. Conductors (not shown) in cable 120 can attach to pads on a board (not shown) or other structure within EMI shield 300. Circuits and components (not shown) can be located on the board. Contacts 224 can be attached to the board and otherwise be supported by housing 222.

EMI shield 300 can protect circuitry and components of connector insert 122 (shown in FIG. 2) from electro-magnetic interference generated by nearby or associated sources. EMI shield 300 can further protect nearby or associated circuits from electro-magnetic interference generated by circuitry and components within connector insert 122.

The two EMI shield portions 310 can be identical. The two EMI shield portions 310 can be rotationally symmetrical and arranged to fit together to form EMI shield 300. This can reduce the number of parts that need to be designed, manufactured, tracked, inventoried, and inspected. Also, using two identical EMI shield portions 310 can reduce the number of manufacturing steps needed to form EMI shield 300. For example, where two or more different parts are used, a corresponding increase in a number of different stamping or other manufacturing steps can be needed. Also, using two identical EMI shield portions 310 can reduce the number of different toolings needed to form EMI shield 300. For example, where two or more different parts are used, a corresponding increase in a number of different toolings can be needed. Where two or more identical EMI shield portions 310 are used, there is no increase in the number of additional different manufacturing steps or in the number of additional different toolings needed to form the second EMI shield portion 310.

EMI shield portions 310 can each include body 312, extension 330, and crimp arm 340. Including crimp arm 340 and body 312 in one part can further reduce the number of parts that need to be manufactured to form connector insert 122. Extension 330 can join the body 312 to crimp arm 340. Each crimp arm can include a curved section 342 and a straight section 344.

The crimping features of EMI shield 300 can be configured such that when two EMI shield portions 310 are joined to form EMI shield 300, cable 120 can pass through opening 304 formed by two curved sections 342 of the crimp arms 340. A braiding or other shield (not shown) of cable 120 can be exposed and can physically and electrically contact the crimp arms 340 of EMI shield 300. Straight sections 344 can be compressed around cable 120 to encircle cable 120 during manufacturing. For example, a single crimping tool (not shown), or a reduced number of crimping tools, can be used to wrap straight sections 344 around cable 120. Also, the crimp can be sufficiently effective that solder is not needed to ensure an electrical connection between crimp arms 340 and cable the braiding of cable 120. Manufacturing of a connector insert or connector receptacle can be simplified and one or more steps can be omitted since a reduced number of steps can be needed for crimping and soldering is not needed for a reliable connection.

This simplified crimping step can further conserve resources by using a reduced number of crimping tools, a reduced number of crimping steps, or both. Whereas conventionally several tools can be used to form a crimp by pushing metal into a shield or braiding of cable 120, the inclusion of crimp arms 340 can allow a crimp to be formed using a single or reduced number of tools. Also, whereas conventionally several steps can be used to form a crimp by pushing metal from different directions into a shield or braiding of cable 120, the inclusion of crimp arms 340 can allow a crimp to be formed using a single or reduced number of manufacturing steps.

After crimping, straight sections 344 can overlap. For example, crimp arms 340 can each encircle 270 degrees around cable 120, though crimp arms 340 can each encircle between 180 degrees and 360 degrees around cable 120. In these and other embodiments of the present invention, crimp arms 340 can be arranged to not overlap, or to overlap a minimal amount. For example, crimp arms 340 can each encircle 180 degrees or less than 180 degrees around cable 120. Configurations where crimp arms 340 do not overlap, or where the overlap is limited, can keep the crimp around cable 120 to a minimal thickness, which can help in forming strain relief 210, cover 200, and other parts of connector insert 122 or a connector receptacle.

These and other embodiments of the present invention can provide EMI shield portions having interlocking features. These interlocking features can include one or more first tabs 320 that can fit under a surface of body 312, and one or more second tabs 322 that can fit in one or more corresponding notches or cutouts 313. These interlocking features are shown further in FIG. 4.

In FIG. 4, each EMI shield portion 310 can include one or more interlocking features. These interlocking features can allow two or more EMI shield portions 310 to mate or fit together to form EMI shield 300. For example, each EMI shield portion 310 can include one, two, or more than two first tabs 320 that can fit under a surface of body 312 of a mating EMI shield portion 310. Each EMI shield portion 310 can include one, two, or more than two second tabs 322 (shown in FIG. 3) that can fit in corresponding notches or cutouts 313 (shown in FIG. 3) in body 312 of the mating EMI shield portion 310. The one or more first tabs 320 and one or more second tabs 322 can be on the same side of body 312 or they can be on opposite sides of body 312. Extensions 330 can join crimp arms 340 to body 312. Curved sections 342 of crimp arms 340 can form opening 304 for cable 120 (shown in FIG. 2.) The mated EMI shield portions 310 can be soldered, laser-welded, spot-welded, or otherwise fixed together to form EMI shield 300.

Figure 5:
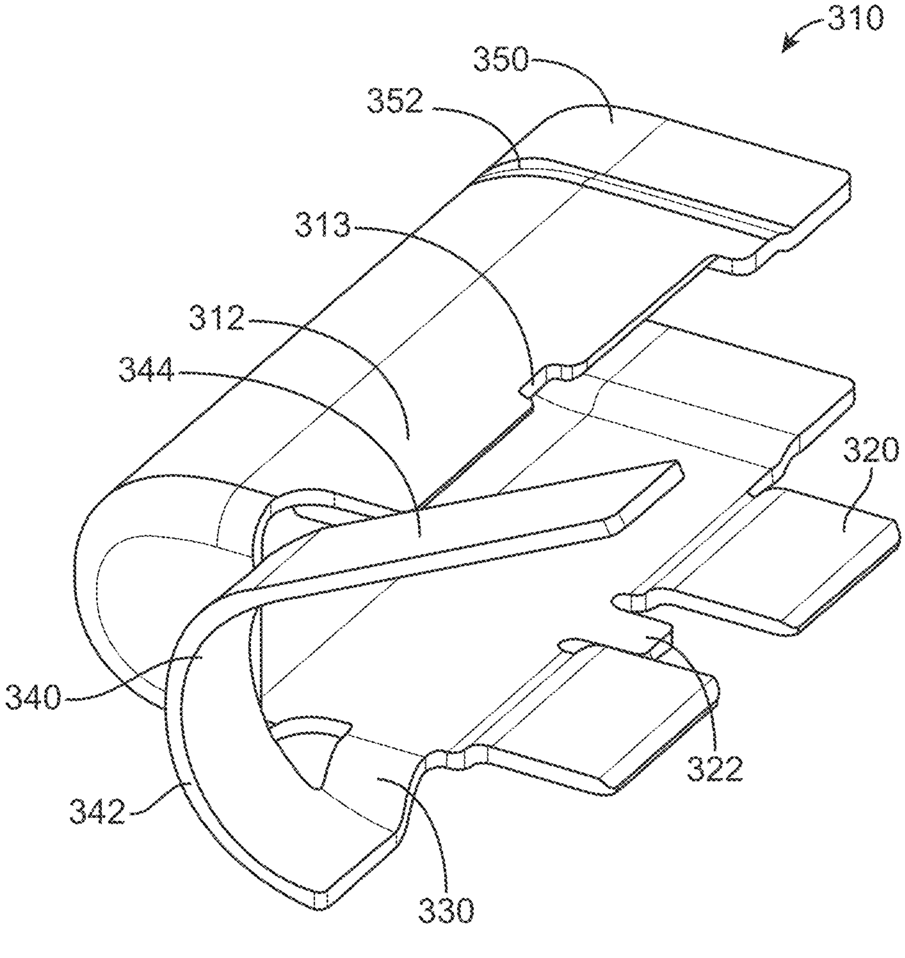
FIGS. 5-8 illustrate an EMI shield portion according to an embodiment of the present invention.

FIGS. 5-8 illustrate an EMI shield portion according to an embodiment of the present invention. In FIG. 5, EMI shield portion 310 can include body 312 and crimp arm 340, as well as extension 330 joining body 312 to crimp arm 340. Tabs 320 can extend from body 312 and can fit under a surface of body 312 of a mated EMI shield portion 310 (not shown.) Tab 322 can extend from body 312 and can fit in notch or cutout 313 (shown in FIG. 3) in body 312 of a mated EMI shield portion 310. Crimp arm 340 can include curved section 342 and straight section 344. Tapered section 352 can lead to narrowed section 350 at front opening 302. Narrowed section 350 can be sized improve a fit with shell 220 (shown in FIG. 2) and provide locations for soldering, laser-welding, or spot-welding shell 220 to EMI shield 300 (shown in FIG. 3.)

Figure 6:
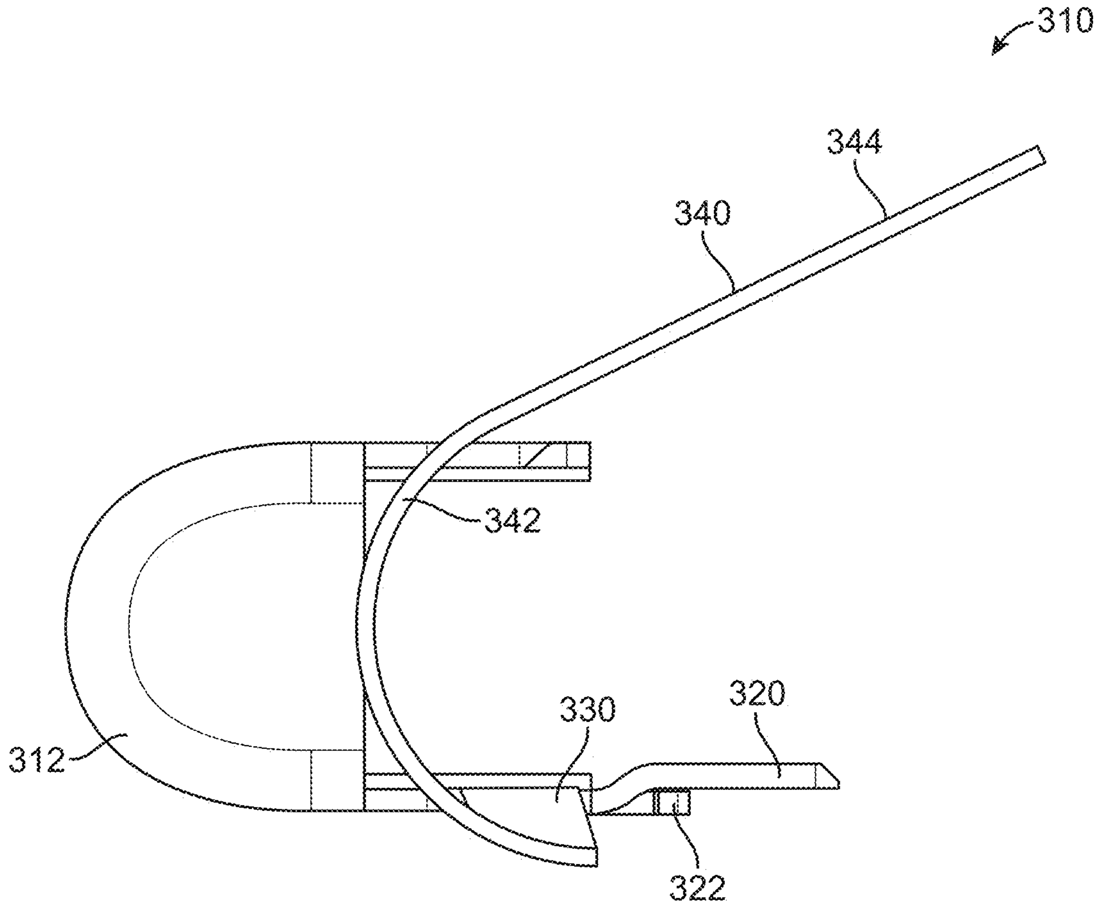

In FIG. 6, EMI shield portion 310 can include extension 330 joining body 312 to crimp arm 340. Tabs 320 can extend from body 312. Tabs 320 can be bent in an upward direction as shown such that they can fit under a surface of body 312 of a mated EMI shield portion 310 (not shown.) Tab 322 can extend from body 312 and can fit in notch or cutout 313 (shown in FIG. 5) in body 312 of a mated EMI shield portion 310. Since tab 322 fits in notch or cutout 313, tab 322 is not shown as being bent in this example, though other arrangements can be made consistent with embodiments of the present invention. Crimp arm 340 can include curved section 342 and straight section 344.

Figure 7:
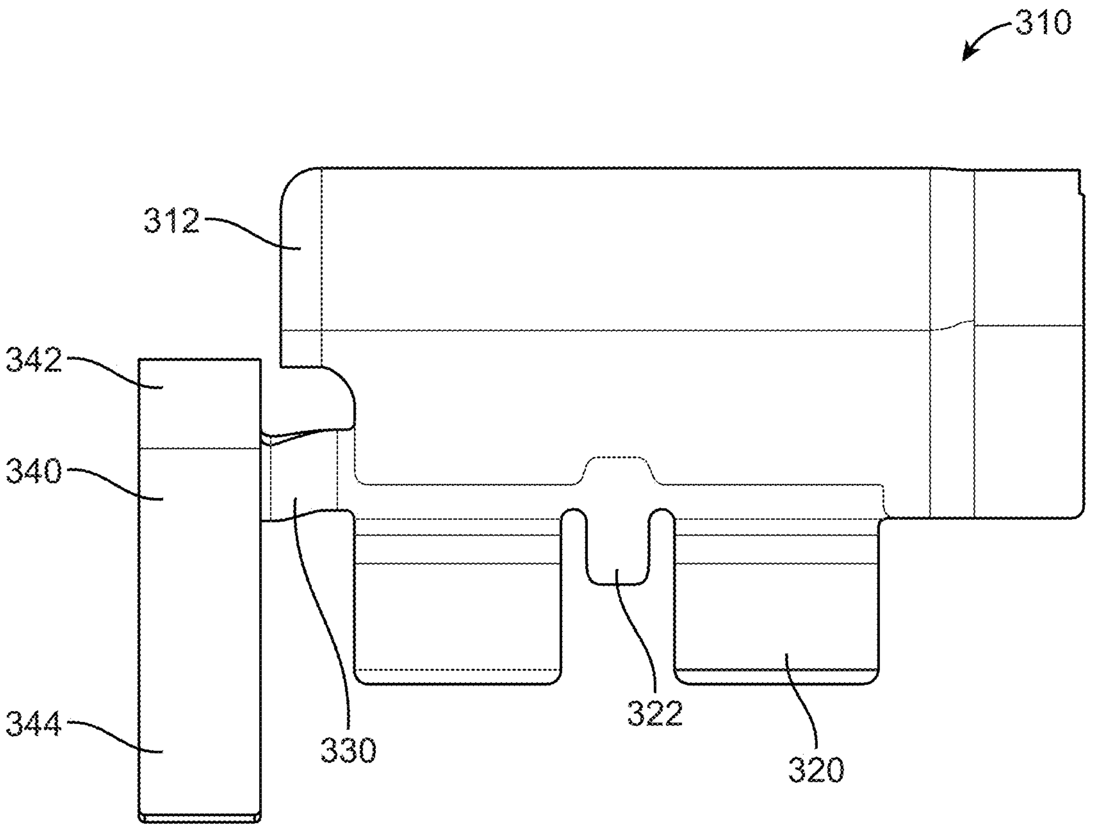

In FIG. 7, EMI shield portion 310 can include extension 330 joining body 312 to crimp arm 340. Tabs 320 can extend from body 312. Tab 322 can extend from body 312 and can fit in notch or cutout 313 in body 312 of a mated EMI shield portion 310. Crimp arm 340 can include curved section 342 and straight section 344.

Figure 8:
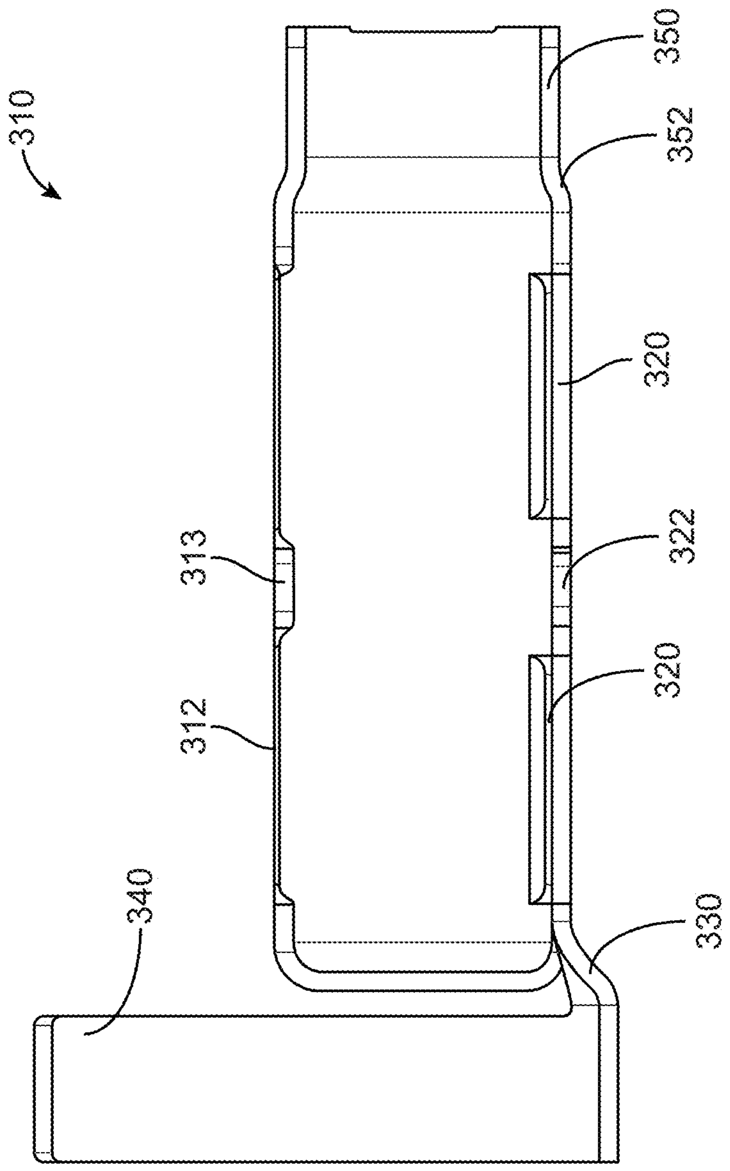

In FIG. 8, EMI shield portion 310 can include extension 330 joining body 312 to crimp arm 340. Tabs 320 can extend from body 312. In this example, two tabs 320 are shown, though in these and other embodiments of the present invention, one, three, or more than three tabs 320 can be included. Tabs 320 can be bent in an upward direction as shown such that they can fit under a surface of body 312 of a mated EMI shield portion 310 (not shown.) Tab 322 can extend from body 312 and can fit in notch or cutout 313 in body 312 of a mated EMI shield portion 310. In this example, one tab 322 to fit in one notch or cutout 313 is included, though in these and other embodiments of the present invention, one, three, or more than three tabs 322 and corresponding notches or cutouts 313 can be included. Since tab 322 fits in notch or cutout 313, tab 322 is not shown as being bent in this example, though other arrangements can be made consistent with embodiments of the present invention. Tapered section 352 can lead to narrowed section 350 at front opening 302.

Extension 330 can attach to various locations on body 312 of EMI shield portion 310. Extension 330 can typically attach to a rear of body 312. In the example shown here, extension 330 can attach to body 312 at or near the bottom (as shown here) of body 312 near one of tabs 320. In these and other embodiments of the present invention, extension 330 can attach to body 312 near or a top of the body, at or near a center or midpoint of the body, or elsewhere at or near the rear of body 312.

Extension 330 can attach to various locations of crimp arm 340 of EMI shield portion 310. Extension 330 can typically attach to curved section 342 (shown in FIG. 5) of crimp arm 340 of EMI shield portion 310. In the example shown here, extension 330 can attach to an end of curved section 342 of crimp arm 340 of EMI shield portion 310. Extension 330 can attach to crimp arm 340 at or near an end of curved section 342, at or near a center of curved section 342, between the center and the end of curved section 342, between the center of curved section 342 and a start of straight section 344 (shown in FIG. 5), at a start of straight section 344, or other location on curved section 342 or elsewhere on crimp arm 340.

Figure 9:
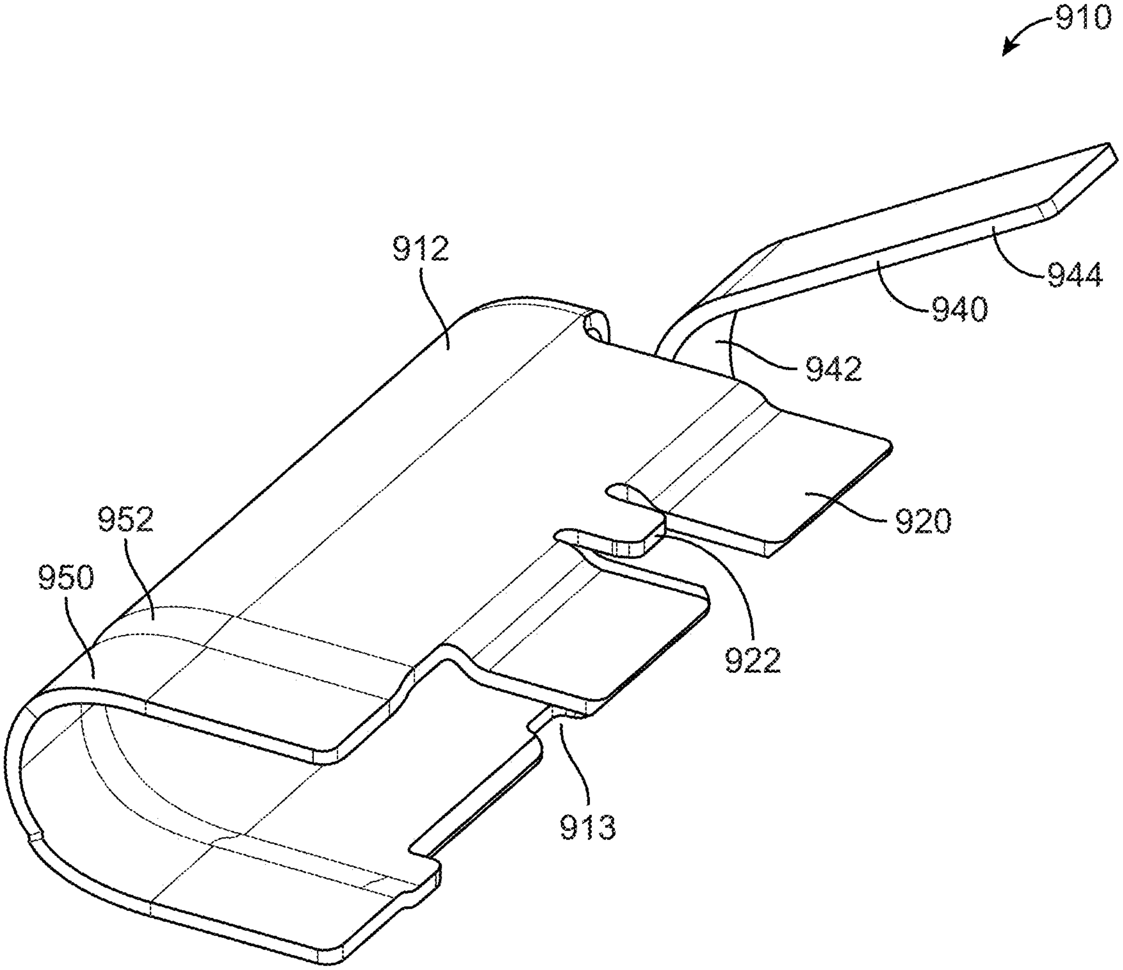
FIGS. 9-12 illustrate another EMI shield portion according to an embodiment of the present invention.

FIGS. 9-12 illustrate another EMI shield portion according to an embodiment of the present invention. In FIG. 9, EMI shield portion 910 can include body 912 and crimp arm 940, as well as extension 930 (shown in FIG. 10) joining body 912 to crimp arm 940. Two EMI shield portions 910 can be used to form an EMI shield similar to EMI shield 300 (shown in FIG. 3.) For simplicity, an EMI shield formed by two EMI shield portions 910 can be referred to here as EMI shield 300.

EMI shield portion 910 can be similar to EMI shield portion 310 (shown in FIG. 5) with a few differences. For example, crimp arm 940 can attach to body 912 at a rear of body 912. Specifically, extension 930 (shown in FIG. 11) can attach crimp arm 940 to body 912 at a center of a rear section of body 912 (shown more clearly in FIG. 10), whereas extension 330 can attach crimp arm 340 to body 312 at a bottom of body 312 (all shown in FIG. 5.) Extension 930 can attach to crimp arm 940 near a center of curved section 942 of crimp arm 940, whereas extension 330 can attach crimp arm 340 near an end of curved section 342 (shown in FIG. 5) of crimp arm 340. Straight section 944 of crimp arm 940 can extend above a side of body 912 supporting tabs 922. In contrast, straight section 344 of crimp arm 340 can extend above a side of body 312 having notch or cutout 313 (shown in FIG. 3.)

Crimp arm 940 can include curved section 942 and straight section 944. These crimping features of EMI shield portion 910 can be configured such that when two EMI shield portions 910 are joined to form EMI shield 300, cable 120 (shown in FIG. 2) can pass through an opening (similar to opening 304 in FIG. 3) formed by two curved sections 942 of crimp arms 940. A braiding or other shield (not shown) of cable 120 can be exposed and can physically and electrically contact the crimp arms 940 of EMI shield portions 910. Straight sections 944 can be compressed around cable 120 to encircle cable 120 during manufacturing. For example, a single crimping tool (not shown), or a reduced number of crimping tools, can be used to wrap straight sections 944 around cable 120. The position of extension 930 in a center of a rear of body 912 can improve the crimping step. In this configuration, extension 930 is not deformed, or is deformed to a reduced amount, during crimping.

This simplified crimping step can further conserve resources by using a reduced number of crimping tools, a reduced number of crimping steps, or both. Whereas conventionally several tools can be used to form a crimp by pushing metal into a shield or braiding of a cable, the inclusion of crimp arms 940 can allow a crimp to be formed using a single or reduced number of tools. Also, whereas conventionally several steps can be used to form a crimp by pushing metal from different directions into a shield or braiding of a cable, the inclusion of crimp arms 940 can allow a crimp to be formed using a single or reduced number of manufacturing steps. The crimp can be sufficiently effective that solder is not needed to ensure an electrical connection between crimp arms 940 and cable the braiding (not shown) of cable 120. Manufacturing of connector insert 122 (shown in FIG. 2) or a connector receptacle can be simplified and one or more steps can be omitted since a reduced number of steps can be required to form the crimp and soldering is not needed for a reliable connection.

After crimping, straight sections 944 can overlap. For example, crimp arms 940 can each encircle 270 degrees around cable 120, though crimp arms 940 can each encircle between 180 degrees and 360 degrees around cable 120. In these and other embodiments of the present invention, crimp arms 940 can be arranged to not overlap, or to overlap a minimal amount. For example, crimp arms 940 can each encircle 180 degrees or less than 180 degrees around cable 120. Configurations where crimp arms 940 do not overlap, or where the overlap is limited, can keep the crimp around cable 120 to a minimal thickness, which can help in forming strain relief 210, cover 200, and other parts of connector insert 122 (all shown in FIG. 2) or a connector receptacle (not shown.)

These and other embodiments of the present invention can provide EMI shield portions 910 having interlocking features. For example, each EMI shield portion 910 can include one or more interlocking features. These interlocking features can allow two or more EMI shield portions 910 to mate or fit together to form EMI shield 300. For example, each EMI shield portion 910 can include one, two, or more than two first tabs 920 that can fit under a surface of body 912 of a mating EMI shield portion 910. Each EMI shield portion 910 can include one, two, or more than two second tabs 922 that can fit in corresponding notches or cutouts 913 in body 912 of the mating EMI shield portion 910. The one or more first tabs 920 and one or more second tabs 922 can be on the same side of body 912 or they can be on opposite sides of body 912. The mated EMI shield portions 910 can be soldered, laser-welded, spot-welded, or otherwise fixed together to form EMI shield 900.

Tapered section 952 can lead to narrowed section 950. Narrowed section 950 can be sized improve a fit with shell 220 (shown in FIG. 2) and provide locations for soldering, laser-welding, or spot-welding shell 220 to EMI shield 300.

Figure 10:
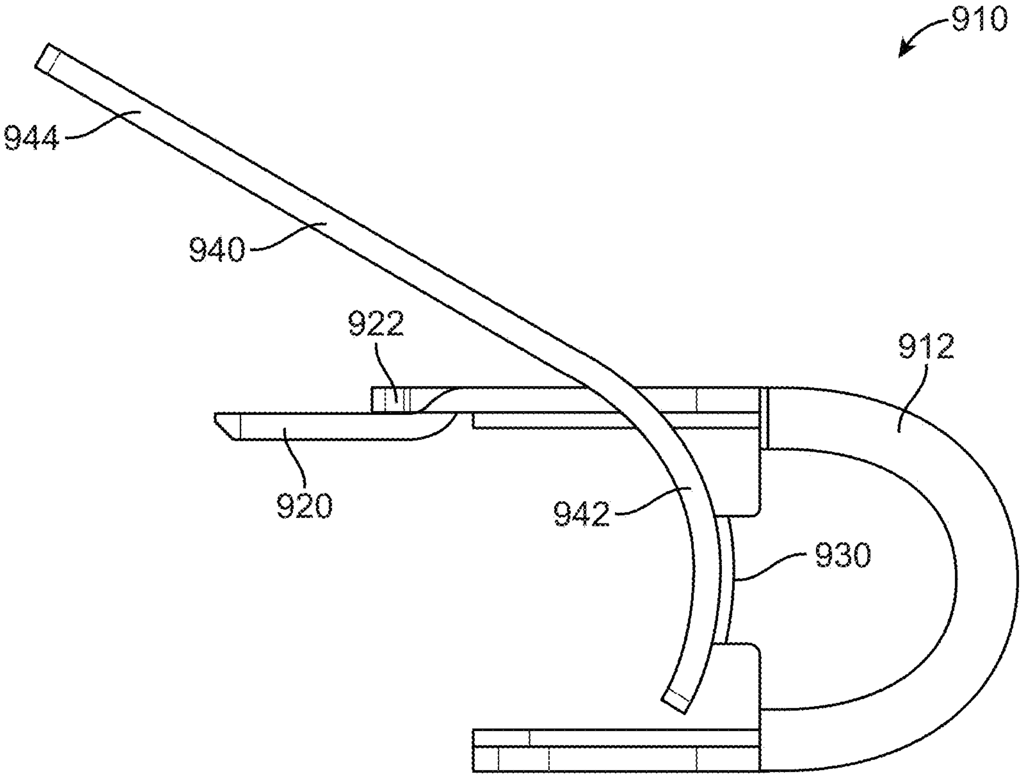

In FIG. 10, EMI shield portion 910 can include extension 930 joining body 912 to crimp arm 940. Tabs 920 can extend from body 912. Tabs 920 can be bent in a downward direction as shown such that they can fit under a surface of body 912 of a mated EMI shield portion 910 (not shown.) Tab 922 can extend from body 912 and can fit in notch or cutout 913 (shown in FIG. 9) in body 912 of a mated EMI shield portion 910. Since tab 922 fits in notch or cutout 913, tab 922 is not shown as being bent in this example, though other arrangements can be made consistent with embodiments of the present invention. Crimp arm 940 can include curved section 942 and straight section 944. Extension 930 can join a rear of body 912 at or near its center to curved section 942 at or near its center.

Figure 11:
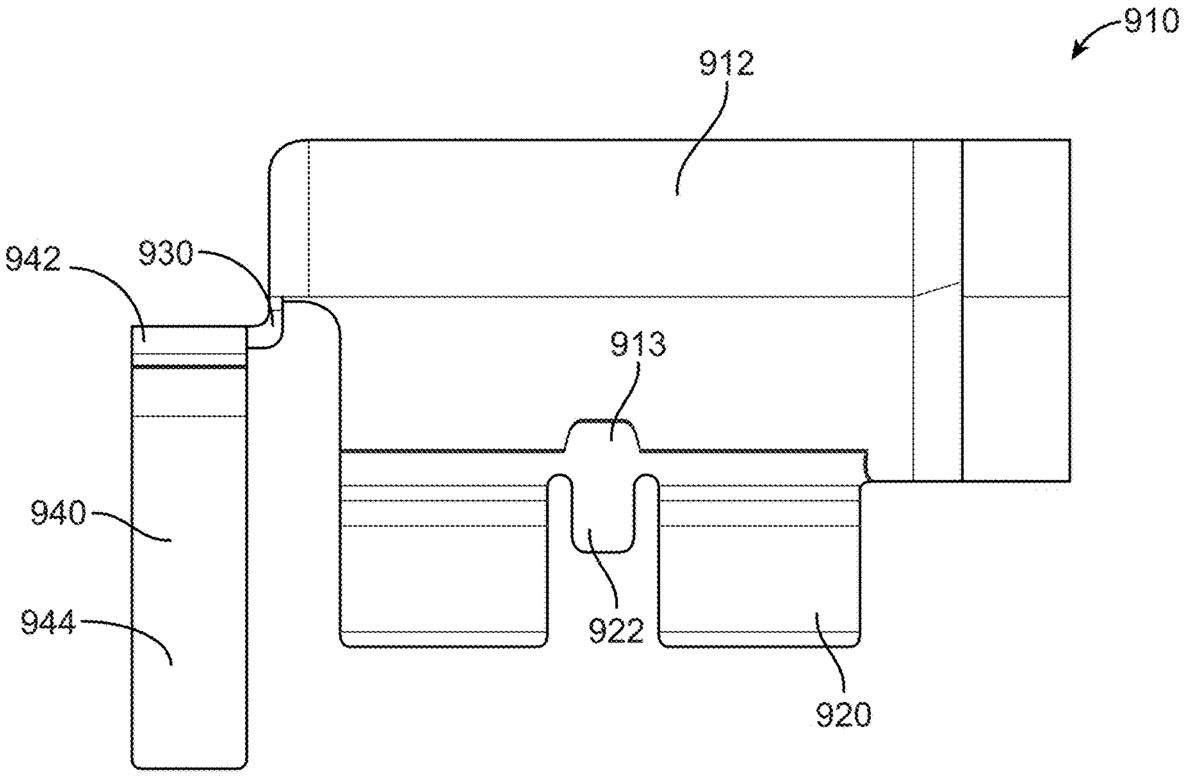

In FIG. 11, EMI shield portion 910 can include extension 930 joining body 912 to crimp arm 940. Tabs 920 can extend from body 912 and can fit under a surface of body 912 of a mated shield portion 910 (not shown.) Tab 922 can extend from body 912 and can fit in notch or cutout 913 in body 912 of the mated EMI shield portion 910. Crimp arm 940 can include curved section 942 and straight section 944.

Figure 12:
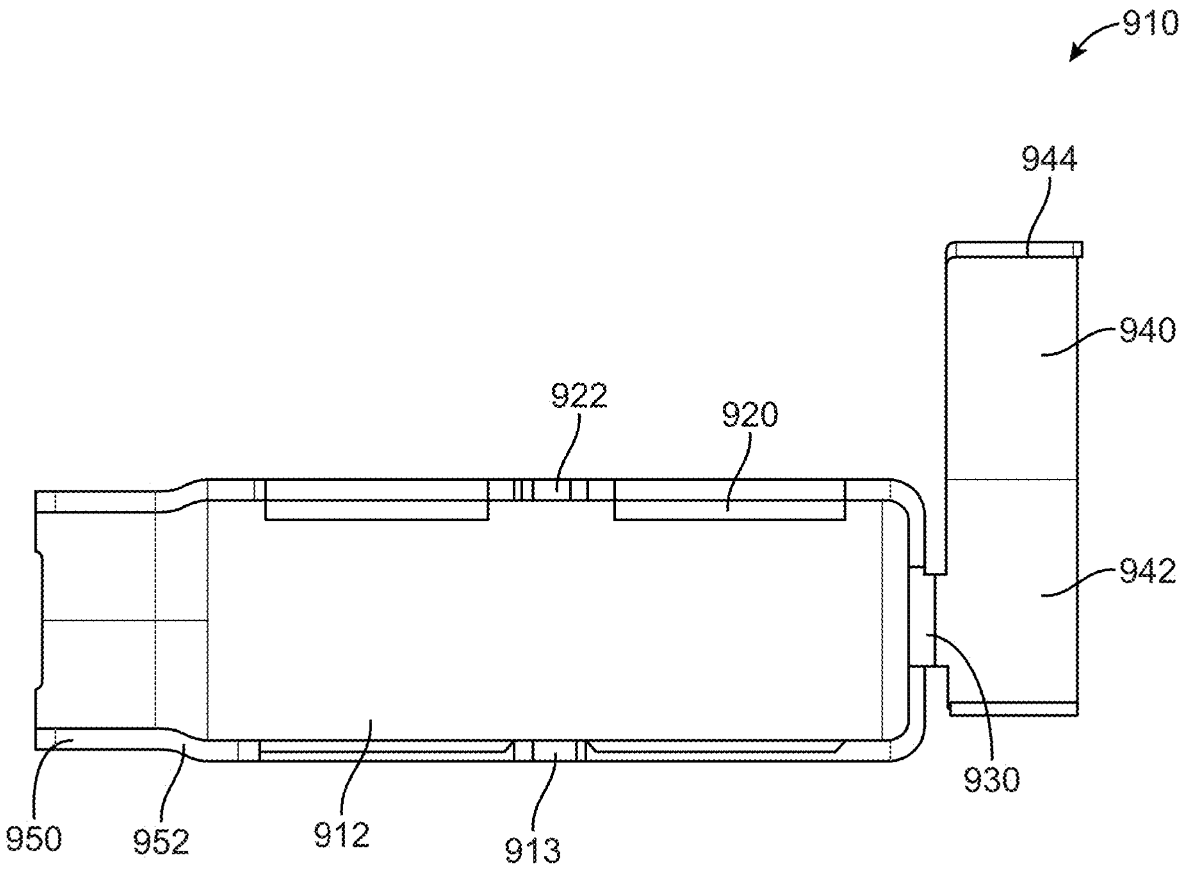

In FIG. 12, EMI shield portion 910 can include extension 930 joining body 912 to crimp arm 940. Tabs 920 can extend from body 912. In this example, two tabs 920 are shown, though in these and other embodiments of the present invention, one, three, or more than three tabs 920 can be included. Tabs 920 can be bent in a downward as shown such that they can fit under a surface of body 912 of a mated EMI shield portion 910 (not shown.) Tab 922 can extend from body 912 and can fit in notch or cutout 913 in body 912 of the mated EMI shield portion 910. In this example, one tab 922 to fit in one notch or cutout 913 is included, though in in these and other embodiments of the present invention, one, three, or more than three tabs 922 and corresponding notches or cutouts 913 can be included. Since tab 922 fits in notch or cutout 913, tab 922 is not shown as being bent in this example, though other arrangements can be made consistent with embodiments of the present invention. Crimp arm 940 can include curved section 942 and straight section 944. Tapered section 952 can lead to narrowed section 950. Narrowed section 950 can be sized improve a fit with shell 220 (shown in FIG. 2) and provide locations for soldering, laser-welding, or spot-welding shell 220 to EMI shield 300.

Extension 930 can attach to various locations on body 912 of EMI shield portion 910. Extension 930 can typically attach to a rear of body 912. In the example shown here, extension 930 can attach to body 912 at or near a center (as shown here) of a rear of body 912 near one of tabs 920. In these and other embodiments of the present invention, extension 930 can attach to a rear or other portions of body 912 near or a top of the body, at or near a center or midpoint of the body, or elsewhere at or near the rear of body 912.

Extension 930 can attach to various locations of crimp arm 940 of EMI shield portion 910. Extension 930 can typically attach to curved section 942 of crimp arm 940 of EMI shield portion 910. In the example shown here, extension 930 can attach to a center of curved section 942 of crimp arm 940 of EMI shield portion 910. Extension 930 can attach to crimp arm 940 at or near an end of curved section 942, at or near a center of curved section 942, between the center and the end of curved section 942, between the center of curved section 942 and a start of straight section 944, at a start of straight section 944, or other location on curved section 942 or elsewhere on crimp arm 940.

These and other embodiments of the present invention can provide connector inserts or connector receptacles that can be manufactured in very large numbers. Accordingly, it can be desirable to simplify the manufacturing of connector inserts and connector receptacles in order to conserve resources. Connector inserts and connector receptacles can be manufactured using many individual parts. Each of these different parts needs to be designed, manufactured, tracked, inventoried, and inspected before it can be used to help form a connector insert or connector receptacle. Accordingly, embodiments of the present invention can reduce a number of different parts needed by using two, three, or more than three identical parts to form a structure of a connector insert or connector receptacle. In the above examples, two identical EMI shield portions 310 or 910 can be used to form EMI shield 300. By using identical parts in this way, a total number of different parts can be reduced. Also, it can be desirable to reduce a number of different manufacturing steps need to complete a connector insert or connector receptacle. Using identical EMI shield portions 310 or 910 can mean that no additional different manufacturing steps are needed for a second EMI shield portion 310 or 910. It can also be desirable that these parts are configured in such a way as to simplify their inclusion in a connector insert or connector receptacle, for example by simplifying one or more manufacturing steps needed to use the parts during manufacturing. Accordingly, embodiments of the present invention can provide crimp arms 340 or 940 that can be used to crimp cable 120 to EMI shield 300 with a reduced number of steps. It can also be desirable to reduce a number of toolings that is needed to form a connector insert or connector receptacle. Accordingly, embodiments of the present invention can provide crimp arms 340 or 940 that can be used to crimp a cable 120 to EMI shield 300 using a reduced number of toolings.

In these and other embodiments of the present invention, EMI shields, contacts, shells, and other conductive portions of a connector insert or connector receptacle can be formed by stamping, progressive stamping, forging, metal-injection molding, deep drawing, machining, micro-machining, computer-numerically controlled (CNC) machining, screw-machining, 3-D printing, clinching, or other manufacturing process. The conductive portions can be formed of stainless steel, steel, copper, copper-titanium, phosphor-bronze, brass, nickel gold, copper-nickel, silicon alloys, or other material or combination of materials. They can be plated or coated with one or more layers of nickel, palladium, palladium-nickel, gold, or other material or combination of materials.

The nonconductive portions, such as housing, covers, strain reliefs, and other structures, can be formed using insert molding, injection molding, or other molding, 3-D printing, machining, or other manufacturing process. The nonconductive portions can be formed of silicon or silicone, polyimide, glass-filled nylon, polycarbonate, rubber, hard rubber, plastic, nylon, liquid-crystal polymers (LCPs), ceramics, thermoplastic elastomers (TPE) or other nonconductive material or combination of materials. The adhesives can be a pressure sensitive adhesive, heat activated film, polyimide film, or other adhesive. The boards can be flexible circuit boards or printed circuit boards and can be formed of FR-4 or other material.

Embodiments of the present invention can provide connector inserts and connector receptacles that are compliant with various standards such as Universal Serial Bus (USB), USB Type-C, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future.

Embodiments of the present invention can provide connector inserts and connector receptacles, where the connector receptacles can be located in various types of devices, such as portable computing devices, tablet computers, laptop computers, desktop computers, all-in-one computers, cell phones, storage devices, wearable-computing devices, portable computing devices, portable media players, navigation systems, monitors, adapters, and other devices, as well as corresponding connector inserts.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A connector insert comprising:

a cable comprising a plurality of conductors and a cable shield;

a plurality of contacts, wherein a contact in the plurality of contacts is coupled to one of the plurality of conductors;

a housing supporting the plurality of contacts;

a shell around the housing and contacts; and an electro-magnetic interference (EMI) shield attached to the shell, wherein the EMI shield comprises:

a first EMI shield portion; and a second EMI shield portion, the second EMI shield portion identical to the first EMI shield portion, wherein the first EMI shield portion and the second EMI shield portion each comprise interlocking features, a body, a crimp arm, and an extension to join the crimp arm to the body, wherein interlocking features on the first EMI shield portion physically contact and engage with interlocking features on the second EMI shield portion, and wherein the crimp arms are wrapped around the cable to contact the cable shield, the crimp arm of the first EMI shield portion contacts and wraps around a portion of the crimp arm of the second EMI shield portion, and the crimp arm of the second EMI shield portion contacts and wraps around a portion of the crimp arm of the first EMI shield portion.

2. The connector insert of claim 1 wherein the interlocking features on each of the first EMI shield portion and the second EMI shield portion comprise a first tab and a second tab to fit under the body of the other EMI shield portion, and a third tab to fit in a corresponding notch in the body of the other EMI shield portion.

3. The connector insert of claim 1 wherein each crimp arm comprises a curved section.

4. A connector insert comprising:

a cable comprising a plurality of conductors and a cable shield;

a plurality of contacts, wherein a contact in the plurality of contacts is coupled to one of the plurality of conductors;

a housing supporting the plurality of contacts;

a shell around the housing and contacts; and an electro-magnetic interference (EMI) shield attached to the shell, wherein the EMI shield comprises:

a first EMI shield portion; and a second EMI shield portion, wherein the first EMI shield portion and the second EMI shield portion each comprise a body, a crimp arm, and an extension to join the crimp arm to the body, wherein the first EMI shield portion and the second EMI shield portion each comprise interlocking features, wherein interlocking features on the first EMI shield portion physically contact and engage with interlocking features on the second EMI shield portion, wherein the crimp arms are wrapped around the cable to contact the cable shield, the crimp arm of the first EMI shield portion contacts and wraps around a portion of the crimp arm of the second EMI shield portion, and the crimp arm of the second EMI shield portion contacts and wraps around a portion of the crimp arm of the first EMI shield portion.

5. The connector insert of claim 4 wherein each crimp arm comprises a curved section.

6. The connector insert of claim 4 wherein the first EMI shield portion and the second EMI shield portion are identical.

7. The connector insert of claim 6 wherein the interlocking features on each of the first EMI shield portion and the second EMI shield portion comprise a first tab and a second tab to fit under the body of the other EMI shield portion, and a third tab to fit in a corresponding notch in the body of the other EMI shield portion.

8. A connector comprising:

a first portion; and a second portion, wherein the first portion is identical to the second portion, and wherein the first portion and the second portion each comprise interlocking features to engage with corresponding interlocking features on the other portion, wherein interlocking features on the first portion physically contact and engage with interlocking features on the second portion, wherein the first portion is a first electro-magnetic interference (EMI) shield portion and the second portion is a second EMI shield portion, wherein the first EMI shield portion and the second EMI shield portion each comprise a body, a crimp arm, and an extension to join the crimp arm to the body, and wherein the crimp arms are wrapped around a cable to contact a cable shield, the crimp arm of the first EMI shield portion contacts and wraps around a portion of the crimp arm of the second EMI shield portion, and the crimp arm of the second EMI shield portion contacts and wraps around a portion of the crimp arm of the first EMI shield portion.

9. The connector of claim 8 wherein the first EMI shield portion and the second EMI shield portion are identical.

10. The connector of claim 8 wherein the interlocking features on each of the first EMI shield portion and the second EMI shield portion comprise a first tab and a second tab to fit under the body of the other EMI shield portion, and a third tab to fit in a corresponding notch in the body of the other EMI shield portion.

11. The connector of claim 10 wherein the connector is a connector insert.

12. The connector of claim 11 wherein during assembly of the connector insert, each crimp arm is wrapped around the cable to contact the cable shield.

* * * * *